Jan. 22, 1935.  J. T. LOVETT, JR  1,988,691
PLANT BALL PACKAGE
Filed May 1, 1934
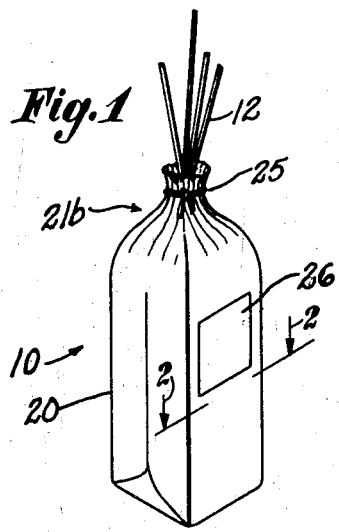
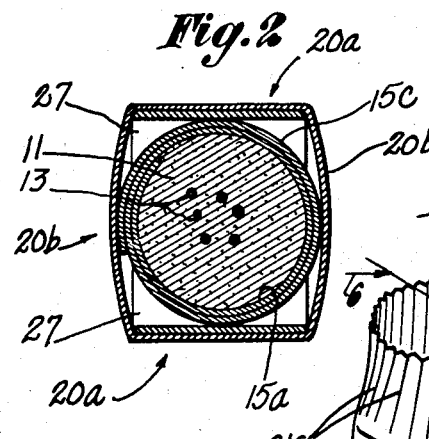
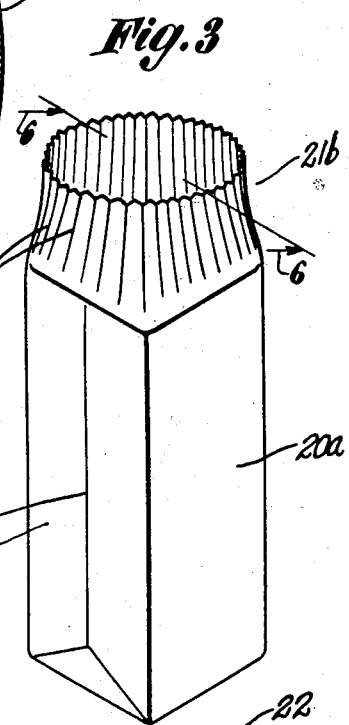
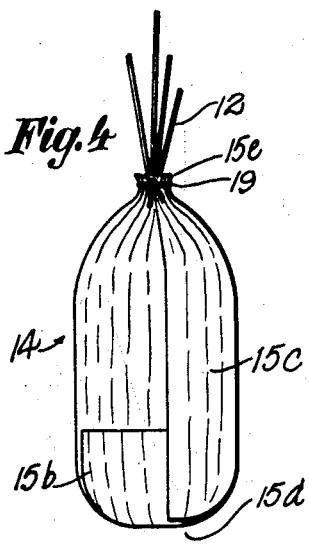
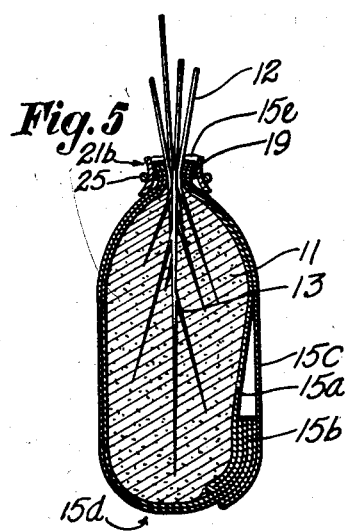
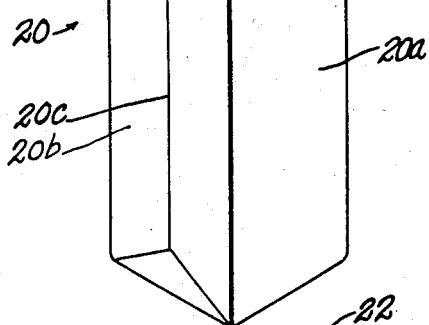
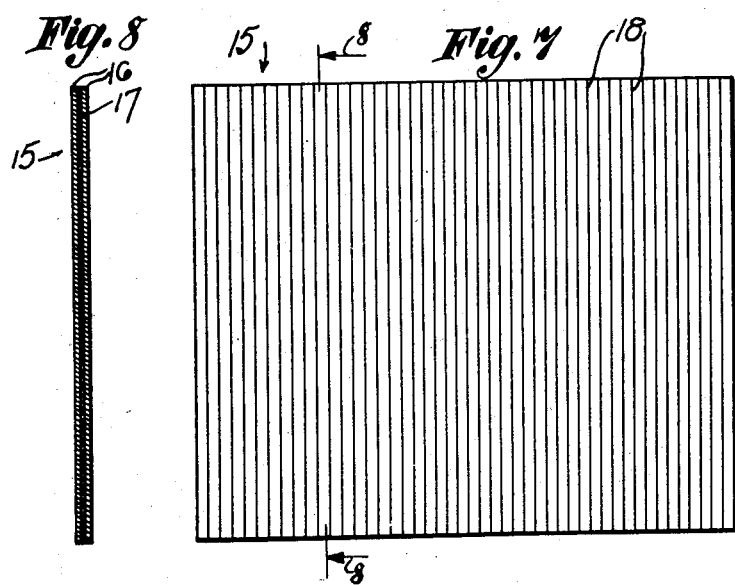
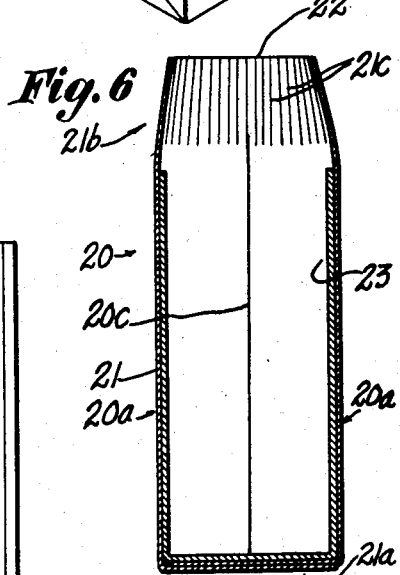
INVENTOR:
John Thompson Lovett, Jr.
BY
ATTORNEY Patented Jan. 22, 1935

1,988,691

UNITED STATES PATENT OFFICE 1,988,691

PLANT BALL PACKAGE

John Thompson Lovett, Jr., Little Silver, N. J.

Application May 1, 1934, Serial No. 723,322

7 Claims. (Cl. 47—37)

This invention relates to plant ball packages, and has among its objects the provision of improved means for retaining the moisture of a plant ball.

Another object of the invention is the provision of a plant ball package having improved pliable container means providing an air space for insulation against moisture loss.

Another object of the invention is the provision of a plant ball package having an inner wound wrapper and outer box like container both secured around the plant stem and with the wrapper forming a body or core at the plant stem for the container to afford a superior simplified seal at the plant stem, where the most loss of moisture generally occurs.

Another object of the invention is to provide a plant ball package having improved means permitting a degree of collapse of the package in only one direction to facilitate improved packing and shipment of the plant ball thereof because of the weight of the plant ball packages.

Another object of the invention is to furnish an improved plant ball package of simplified, inexpensive construction, and which is neat in appearance, permits the application of printed matter or labels directly thereto, and which is durable, reliable, and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a perspective view of a plant ball package embodying the invention.

Fig. 2 is an enlarged cross sectional view thereof taken on line 2—2 of Fig. 1, with a fragment of the outer container in position.

Fig. 3 is a perspective view of the outer container, alone.

Fig. 4 is a view in side elevation of the inner wound wrapper applied to a plant ball.

Fig. 5 is a vertical cross sectional view thereof.

Fig. 6 is a vertical cross sectional view taken on line 6—6 of Fig. 3.

Fig. 7 is a plan view of a sheet of material used to provide the inner wrapper of Fig. 4.

Fig. 8 is a sectional view thereof on line 8—8 of Fig. 7.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a plant ball package embodying the invention. The same may include a plant ball 11 having a plant stem 12 and roots 13.

Around the plant ball is wound a pliable waterproof wrapping 14 of a sheet material 15. The latter may be of any suitable kind, but preferably includes two layers of paper 16 with an intervening layer of pitch or other tarry or waterproof binder 17. The sheet material may be crinkled or provided with longitudinal fold lines or corrugations 18 to increase the pliability of the material, and permit the same to be stretchable for accommodation to the shape of the plant ball. The crinkled or corrugated effect referred to may be produced by merely running the material through suitable dies.

The wrapping 14 may be produced by placing the plant ball 11 on the sheet 15 in a horizontal position, winding one end 15a of the material once around the plant ball, then folding a lower edge portion 15b upward, and finally winding the rest of the sheet as shown at 15c so as to cover the layer 15a and also the tucked up end 15b. In this manner a reliable bottom structure 15d is easily and simply provided, and by tying the upper end 15e around the plant stem as by a cord 19, the entire wrapper may be reliably compactly secured around the plant stem.

Since the main loss of moisture from a plant ball generally occurs around the plant stem, the material 15 is particularly adapted to reduce such loss of moisture. Best results may be obtained by winding the sheet of material 15 more closely around the plant stem than about the body of the plant ball; that is, by winding said material somewhat in the shape of a cone. In any case, however, the elastic qualities of the material 15 permits the same, as wound in any suitable manner, to closely hug the plant stem for a tight uniform closure without permitting formation folds that cause openings into the package.

It will be noted that the portion 15e provides a core or body, which is pliable and compressible under the tension of the cord 19 to provide a suitable closure around the plant stem.

The outer container 20 is desirably of box like form and may be generally rectangular as shown, and variously constructed. For example, the container 20 may consist of a carton 21 made of the same triple layer pliable waterproof material as 15, except that it is not crinkled, or corrugated at the main body of the carton. A single layer is shown in the drawing for clearness. The carton may have any suitable folded and secured bottom portion 21a, and a top portion 21b, affording an opening 22. To provide stiffness in a pair of opposite longitudinal walls of the container 20, an insert 23 of cardboard or other stiff material of generally U-shaped form is placed in the carton, and may be continuously adhesively connected thereto or merely fitted thereinto. The container 20 is thus provided with relatively stiff walls 20a and with pliable walls 20b. The pliability of the latter may be increased by longitudinal gusset forming fold lines 20c. Likewise the bottom wall of the insert is pliable as it is adapted to be downwardly concaved by the weight of the plant ball, so that the stiff side walls of the insert come together to hug the plant ball therebetween. As the container 20 correspondingly contracts along fold lines 20c, the pliable bottom wall 21a will concave downward, with the plant ball assuming an easy and natural position without disturbing the roots.

As the insert 23 terminates below the upper portion 21b of the carton, the latter constitutes a throat portion that is pliable throughout. Pliability thereof may be increased by providing longitudinal fold lines 21c therein, angularly spaced relatively closely therearound.

The device shown in Fig. 4 may be inserted into the container 20 through the opening 22 thereof, and the throat 21b of the latter uniformly and evenly contracted or folded at the successive lines 21c around the core 15e by a single motion of the operator's hand around the throat portion. Then a tension element or cord 25 may be tied around said throat portion to seal the container 20 around the plant ball. The cord 25 may supplement the cord 19 to provide increased tightness at the core 15e. Finally a label such as 26 may be pasted on a stiff wall 20a and will be maintained in neat and flat form.

By reason of the coaction of the inner wound wrapping 14 and the outer box like container 20, not only is a superior seal provided around the plant stem, but an insulating air space such as 27 is afforded therebetween which substantially minimizes loss of moisture from the ball 11 by evaporation. Furthermore, the stiff walls 20a prevent collapse or compression of the plant ball package parallel to the planes thereof, and hence the plant ball packages may be piled up on each other with these planes vertical. Nevertheless, the walls 20a may move toward each other for compact packing, and the bottom structure of the container may bulge outward to permit this to occur.

It will be appreciated that various changes and modifications may be made in the device as shown in the drawing, and that the same is submitted in an illustrative and not in a limiting sense, the scope of the invention being defined in the following claims.

I claim:

1. A plant ball package including a plant ball, a pliable waterproof member consisting of a sheet of material wound around the plant ball so as to encase the same completely, said member having a portion provided with an opening for the stem of the plant ball, a tension element securing said portion around said stem, a waterproof container enclosing said member, said container having certain walls thereof of stiff material and other walls of relatively pliable material, said container having a continuously pliable portion having an opening for said stem, and a tension element securing said pliable portion around the plant stem.

2. A plant ball package including a plant ball and a waterproof container therefor, said container being of generally rectangular form and having two opposed walls relatively stiff and the other two opposed walls relatively pliable, said container having one end thereof closed and the opposite end thereof pliable throughout and affording an opening, said pliable end being contracted and secured around a stem of the plant ball projecting through said opening, as set forth.

3. A plant ball package including a plant ball and a waterproof container therefor, said container having certain walls thereof stiff and having a pliable portion at one end of the container, said pliable portion being drawn tightly around the stem of the plant ball.

4. A plant ball package including a plant ball and a waterproof container therefor, said container having certain walls thereof stiff and having a pliable portion at one end of the container, said pliable portion having a series of closely spaced preformed longitudinal fold lines and said portion being contracted around the stem of the plant ball along said fold lines and secured to said stem.

5. A plant ball package including a plant ball, and a waterproof container therefor, said container having relatively stiff opposite front and back walls, the bottom and the side walls being relatively pliable, the top of the container having a continuously pliable throat portion contracted around the stem of the plant ball and secured thereto, as set forth.

6. A plant ball package including a plant ball, a relatively tight waterproof wrapping therefor having a portion secured to the stem of the plant ball, a container enclosing said wrapping and having certain walls thereof stiff to maintain an air space between said wrapping and said container, said container having pliable walls intermediate of the stiff walls whereby the container can be partially flattened, and said container having an end portion uniformly pliable and secured around the plant stem.

7. A plant ball package including a plant ball, a tight waterproof wrapping therearound having an opening portion engaged snugly around the stem of the plant ball, and an elongated container enclosing said wrapping, said container having a stiff longitudinal wall and having a pliable opening portion contracted closely around and secured to said stem.

JOHN THOMPSON LOVETT, Jr.